April 22, 1952 A. R. HEDBERG 2,594,164

EXPANDER DEVICE

Filed Nov. 29, 1946 4 Sheets-Sheet 1

INVENTOR.

Aldrich R. Hedberg

BY

Woodling and Krost attys.

INVENTOR.
Aldrich R. Hedberg
BY
Strodling and Krost
attys.

INVENTOR.
Aldrich R. Hedberg
BY
Woodling and Krost
attys.

April 22, 1952 A. R. HEDBERG 2,594,164

EXPANDER DEVICE

Filed Nov. 29, 1946 4 Sheets-Sheet 4

INVENTOR.
Aldrich R. Hedberg
BY
Hoodling and Krost
attys.

Patented Apr. 22, 1952

2,594,164

UNITED STATES PATENT OFFICE 2,594,164

EXPANDER DEVICE

Aldrich R. Hedberg, Cleveland, Ohio, assignor by direct and mesne assignments, of one-half to Melvin E. Lorentz Application November 29, 1946, Serial No. 713,151

6 Claims. (Cl. 267—1)

My invention relates to sealing and packing devices in general, and relates more particularly to expanders thereof.

There are many types of mechanical devices in which reciprocating members operate relative to stationary members and in which a pressure differential exists along various portions of the members. Pressure pumps make up the mass bulk of these devices but there are many instances in which a reciprocating shaft extends from a relatively low pressure area into a relatively high pressure area. In these devices, the sealing of the differential pressure existing between a low pressure area and a high pressure area is very often an acute problem. In some types of devices, only a moderately efficient seal is required, whereas in other types of devices, a very tight seal is required.

There are, of course, many different types of sealing and packing devices used to cooperate with such devices to form piston packing and pressure gland packing, but the present invention is described and illustrated with the type generally referred to as a cup and flange packing. These packings may be made of leather or other suitable flexible material, and are well known to the industry.

In using these packings, specific problems must be met in order to keep the packing operating efficiently. The cup type packings are generally carried by the movable piston, in the case of the piston type seal, and are movable relative to the piston walls. However, when used to seal about a moving rod, such for example as a piston rod, the packing is generally held stationary with the packing gland, and the piston rod or other moving shaft moves relative thereto.

In devices in which the differential pressure is always substantially constant, and above a predetermined value, there is very little problem in keeping these packings tight, because the pressure upon the packing will always hold the packing tightly against the adjacent member and will cause the packing to continue to press tightly against the adjacent member as wear progresses. However, a different problem exists when the pressure repeatedly fluctuates from a low differential pressure to a high differential pressure. In this type of operation, auxiliary expander devices must be used in connection with the flange of the packing in order to hold the flange tightly against the adjacent member during the build up of differential pressure. If these expander devices are not used to hold the flange tightly in place, the fluid pressure as it is built up will be able to force its way between the packing flange and the adjacent member, because there is no force holding the packing member tightly against the adjacent member. Once this condition exists, no amount of pressure will cause the packing flange to seat tightly against the adjacent member because the fluid pressure on both sides of the packing flange is equal. Therefore, the packing flange remains free to move away from the adjacent member just as if it were under only atmospheric pressure.

Expander devices used in connection with packing flanges to hold the packing flanges tightly against the adjacent member, have become fairly well standardized by the trade today. These devices include expandable piston rings in every way similar to the piston rings used in automobile pistons. The piston ring type of packing expander is quite successful, but is little used by the industry today because of the expense involved in first cost and maintenance. Another well-known type of expander is the solid spring metal expander having the edges thereof notched and bent at an angle to the main body thereof. These devices generally fit against the flange of the packing and the notched and bent edges contact the flange of the packing and press the flange tightly into contact with the adjacent member to be sealed. This type of device is quite successful and is widely used today. However, the outstanding drawback to this type of expander device is its expense. This is especially true for the large piston sizes. When making the larger piston size expander device by this latter method, it is quite often necessary to fabricate the expander from several pieces of smaller material. This is required, because the spring material generally used is spring steel or spring bronze, and these materials are available only in limited widths. Therefore, these materials are obtained in their widest width, and whenever an expander device is required of a greater diameter than the maximum available width, several pieces of the material are fabricated together in order to make a complete device.

Further, the devices in which packing expanders are required, are not generally standardized in size throughout the industry. Accordingly, in order to make expander devices of this latter type, it is often necessary to make a complete set of dies to manufacture only a relatively few expanders. In fact, as often happens, the cost of the dies for making expanders of a given size far exceeds the value of the total number of complete expanders required, even when the size is small enough to be made from one single piece of stock material of the dies.

Accordingly, an object of my invention is to provide a universally flexible expander device capable of being flexed into an arcuate structure.

Another object of my invention is to provide a strip member expander device capable of being flexed into an arcuate structure of any suitable diameter.

Another object of my invention is to cleave and bend a strip of spring metal in a manner capable of providing universal flexibility in said strip.

Other objects and a fuller understanding of my invention may be had by referring to the following description and claims taken in conjunction with the accompanying drawing in which:

Figures 1, 2, 3, 4, 5, 6, 7, 8, 9, 10, 11:
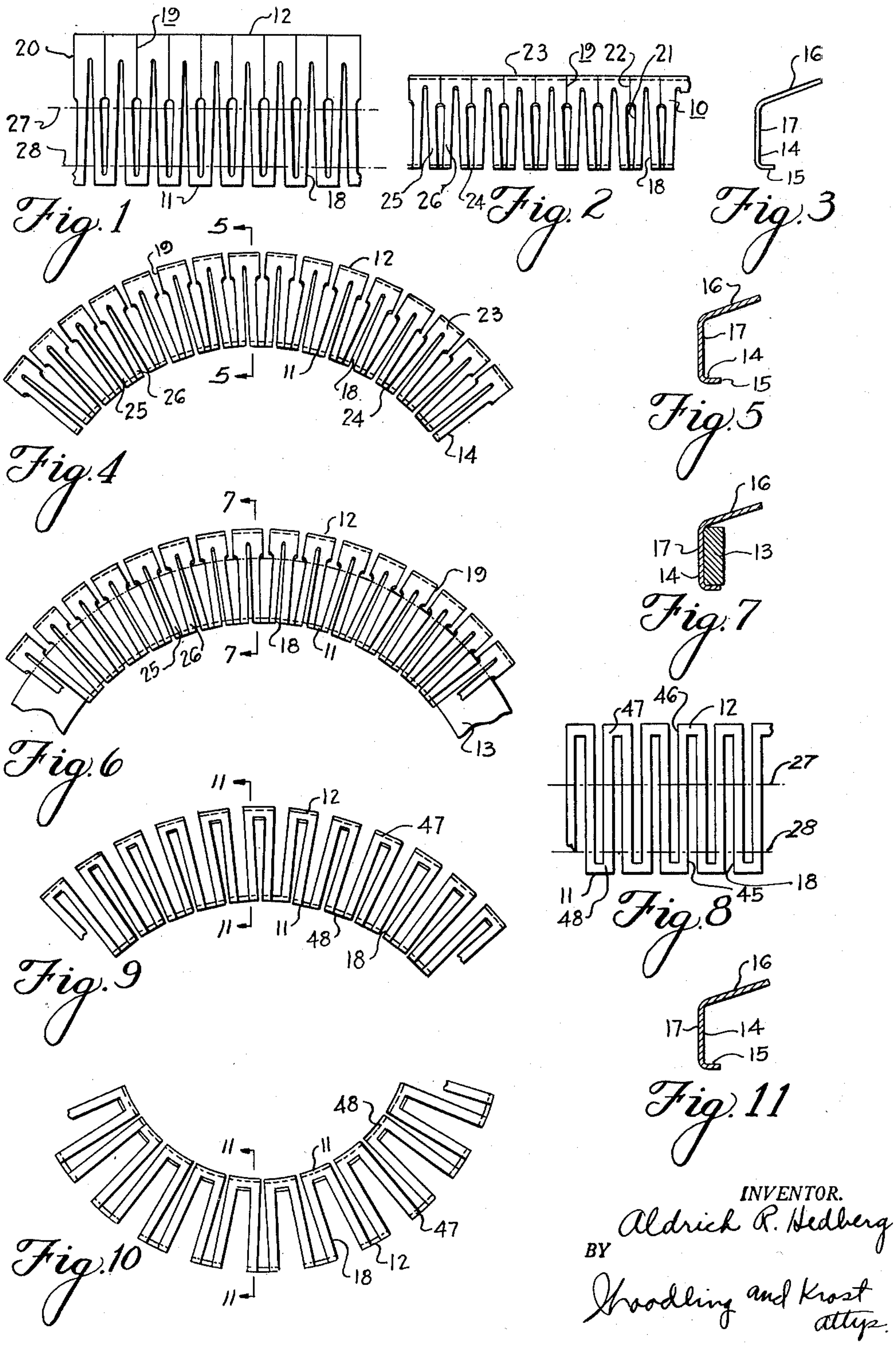
Figure 1 is a plan view of a strip of material blanked out in accordance with the provisions of my invention.
Figure 2 is a top plan view of an expander strip formed in accordance with the provisions of my invention.
Figure 3 is an end view of the Figure 2.
Figure 4 is a top plan view of the formed strip of Figure 2 as it appears arcuately flexed.
Figure 5 is a cross-sectional view along the lines 5—5 of Figure 4.
Figure 6 is a view similar to Figure 4 with a forming ring in conjunction therewith.
Figure 7 is a cross-sectional view along the lines 7—7 of Figure 6.
Figure 8 is a view similar to Figure 1 of a modification of my invention.
Figure 9 is a view similar to Figure 4 of the modified form.
Figure 10 is a top plan view of a formed strip made in accordance with the modified form of my invention as it appears when flexed for use with a shaft type packing flange, or in other words flexed in the opposite manner as compared with the view of Figure 9.
Figure 11 is a sectional view of the modified form.

With reference to the Figure 1 of the drawings, I illustrate the first step in producing an expander device in accordance with the provisions of my invention. In the Figure 1, a blank 20 is produced from a strip of spring metal of the desired width having a first side edge 11 and a second side edge 12. The blank 20 is formed to provide a first series of cleavages 18 extending from said first side edge 11 inwardly of the blank 20 towards the side edge 12. A second series of cleavages 19 extend from the side edge 12 inwardly of the blank 20 toward the side edge 11. The cleavages 18 and 19 are longitudinally staggered as illustrated in the Figure 1 to retain the blank as a one-piece structure. That is, the two series of cleavages are offset in order that they will not produce a divisional cut across the blank 20.

In the preferred embodiment of my invention, for an expander to cooperate with the outwardly extending, or piston type, packing, the series of cleavages 18 are preferably in the form of tapered slots, whereas the series of cleavages 19 are simple division cuts over a portion of their length, and are slotted, as by slots 21, over the remainder of their length in order to relieve the stress concentration which a simple divisional cut would produce by ending directly in a solid wall of metal. Thus, in the Figure 1, I have illustrated each cleavage of the series 19 as comprising a composite of a simple divisional cut 22 and a slot 21. The slot 22, however, could very well be continued the full length of the cleavage 19 with identical results insofar as performance is concerned.

Thus far, I have described my invention only by the steps of producing the preferred embodiment. Fundamentally, the preferred embodiment of the black 20 should comprise a leg member 23 and a leg member 24 at oppositely disposed sides of the blank 20, and connected together by cross legs 25 and 26. That is, each leg member 23 has two cross members 25 and 26 extending therefrom. The cross member 25 extends to a first leg 24, and the cross member 26 extends to a second leg 24 adjacent to the first leg. Likewise, each leg member 24 has two cross members 25 and 26, one leg extending to a first leg 23 and the other cross member extending to a second leg 23 adjacent to the first leg.

As is well known, a sheet of material having a relatively large width and a thin cross-section is not flexible in its own plane, and any force in its own plane will tend to buckle and tear the material. However, this same sheet of material may be quite easily flexed laterally about its thin dimension. In other words, it might be said that a relatively thin piece of material may be readily flexed in any direction except its own plane.

As thus far described, the blank 20 illustrated in the Figure 1 remains in its own original plane. Any attempt to curve the blank 20 in its own plane would be decidedly limited because of the described buckling and tearing tendency which would take place in the legs 23 and 24 between the ends of the slots 18 and the side edge 12, and the end of the slots 21 and the side edge 11.

However, I have found that the blank 20 may be bent about the bend line 27 and 28 as illustrated in the Figure 1, and will produce a strip expander member 10 having the cross-sectional configuration illustrated in the Figure 3, and will then be readily flexible. This apparent phenomena will be readily understood by reference to the Figure 4 of the drawing. In the Figure 4, the strip expander member 10 has been arcuately flexed about a circular circumference. This flexing is brought about by moving the narrow leg members 24 toward one another and reducing the width of the slots 18 at the side edge 11. In moving the narrow legs 24 toward one another, a flexing stress was produced in the wide leg members 23. However, the wide leg members 23 are disposed at an angle to the angle of the cross leg members 25 and 26, and therefore tend to bend about the thin dimension of the material from which it is made rather than in the plane of the material. Accordingly, each individual wide leg member 23 is caused to flex slightly about its thin dimension to allow the cross legs 25 and 26 to approach closer together, and the result is a uniformly arcuate structure having an anchor wall 15 and a pressure wall 16 depending at angles from a bottom land portion 17. See Figures 3 and 5 of the drawing. The leg members 15 and 16, and the bottom land portion 17, are proportioned as illustrated in the Figures 3 and 5 only for the purpose of illustrating the invention. The fundamental requirement being, that at least the solid bridging portion of the legs 15, or the solid bridging portion of the legs 16, (and preferably both when small diameter flexing is required), along the side edges 11 and 12, be disposed at an angle to the plane of the bottom land portion 17. Thus, the cross-sectional configuration of the expander strip member 10 may be considered as being substantially U-shaped.

In the Figures 6 and 7 of the drawings, I illustrate the curved expander strip 10 as being secured to a ring member 13. The ring member 13 is used for the purpose of accurately positioning the strip member 10 and permits the strip member 10 to be placed in position relative to the packing flange without auxiliary spacing and positioning means.

Although I have illustrated the ring member 13 in the drawings as being made of metal, I have found that other types of material such as leather and cardboard paper may be used to advantage, and in some instances is even more advantageous. The forming ring may be secured to the curved expander strip 10 in any suitable manner. In the case of a metal ring, a few spot welds will suffice. When using leather or cardboard paper, I have found it entirely practical to use staples. As before stated, the ring member 13 is used to accurately position the strip member 10 relative to the packing flange. Once in place relative to the packing flange, a heavy pressure plate member is clamped tightly against the ring and expander strip and the expander strip is therefore tightly clamped in place relative to the packing flange. Therefore, the means used to secure the ring and expander strip together need be only of a temporary nature capable of holding the expander strip correctly formed until it is clamped in place by the pressure plate.

Figure 12:
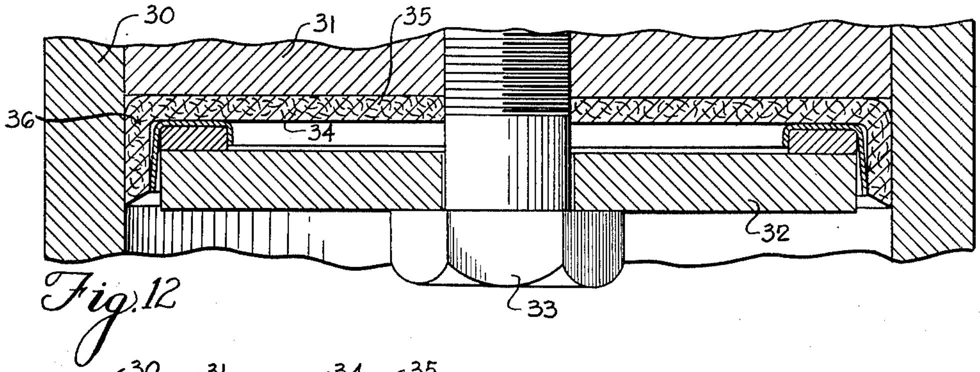
Figure 12 is a cross-sectional view of a piston packing employing my improved expander device and forming ring held in place by a pressure plate.
Figure 13:
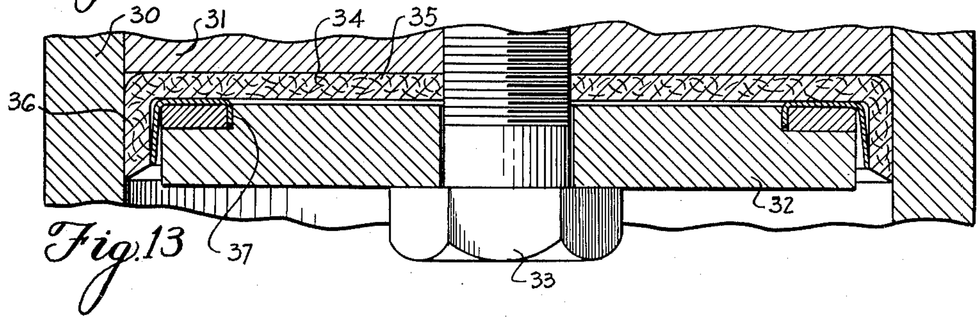
Figure 13 is a view similar to the Figure 12 with a notch provided in the pressure plate to accommodate my improved expanding device and forming ring.
Figure 14:
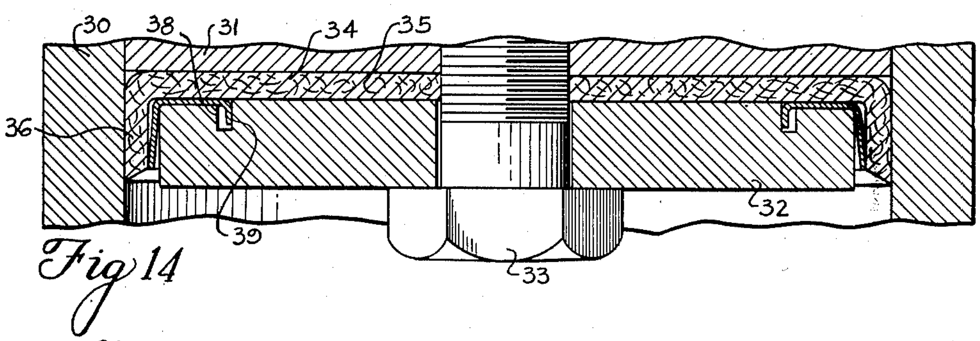
Figure 14 is a view of my improved expander device as directly positioned by the pressure plate.

In the Figures 12, 13 and 14, I illustrate the preferred embodiment of my invention as used with a piston cup type flange packing. In these illustrations, the reference character 30 refers to a cylinder wall, the reference character 31 refers to a piston, and the reference character 32 refers to a pressure plate member held in place by a suitable bolt 33. A commonly used cup type flange packing, in this instance a full diameter cup type flange packing 34, is illustrated. The packing 34 has a disc portion 35 and a flange portion 36.

In the Figure 12, the embodiment of my invention illustrated by the Figures 6 and 7, is employed. In the use of this embodiment of my invention, the packing 34 is pressed into place into the cylinder 30 with the disc portion 35 tightly against the face of the piston 31. My improved expander device as illustrated in the Figures 6 and 7 is then pressed into place as illustrated in the Figure 12 with the pressure wall portion 16 thereof tightly pressing against the flange portion 36 of the packing 34. The pressure wall portion 16 of the expander device 10, it will be noted, tends to extend out further than the available room provided, and will therefore be flexed downwardly toward the pressure plate 32. Therefore, the expander member is ready to serve its purpose by forcing outwardly against the flange 36 and hold the flange 36 tightly against the wall of the cylinder 30. The pressure plate 32 is then placed in contact with the ring 13 and held firmly thereagainst by means of the bolt 33. Therefore, the expander device and ring 13 are held against dislodgment by rapid changes of direction during the operation of the piston 31. The expander device 10 and the ring 13 need no positive placement guide relative to the flange 36, because the ring 13 is provided in the proper diameter, and therefore will accurately position itself relative to the flange 36.

In the Figure 13, I have illustrated a notch 37 in the flange 36 in order to more firmly position the expander device 10 and the ring 13 in place.

In the Figure 14, I have illustrated the use of my improved expander device 10 without the forming ring 13. In this embodiment, the expander strip 13 may be shipped to the point of use in straight strips, or may be flexed into the arcuate condition and the ends thereof locked together. In the use of this expander strip 10 without the forming ring 13, the pressure plate 32 is provided with a narrow notch 38 having a back wall 39 accurately spaced from the inner surface of the flange 36. Thus, the expander strip 10 may be flexed into its arctuate shape, and positioned with the bottom land portion 17 thereof in contact with the surface of the pressure plate 32 between the notch 38 and the outer circumference of the pressure plate 32, and with the anchor wall portion 15 thereof disposed within the notch 38 and against the accurately positioned back walls 39 of the notch 38. Therefore, the pressure wall portion 16 of the expander device 10 will be accurately positioned relative to the inner surface of the flange 36, and will provide even pressure completely around the inner surface of the packing flange 36.

Figures 15, 16:
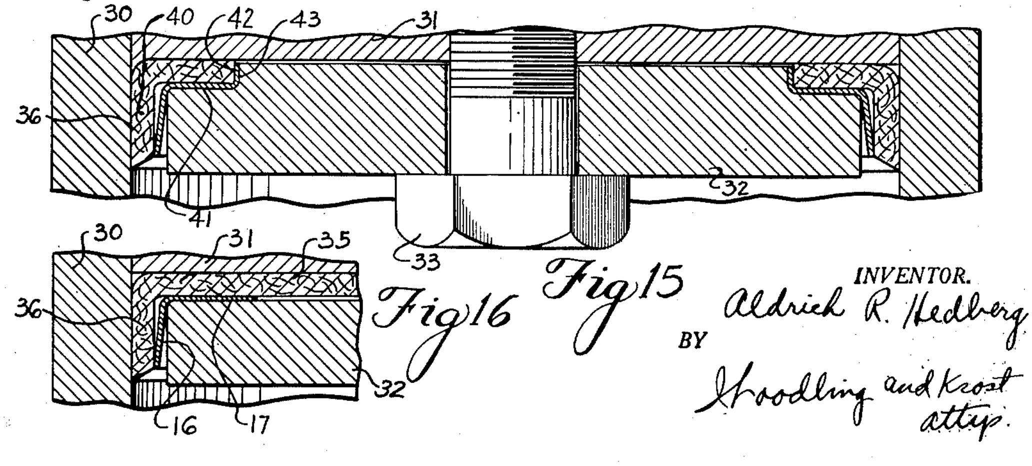
Figure 15 is a modified bending form of my improved expander device.
Figure 16 is another modified bending form of my improved expander device.

In the Figure 15, I have illustrated a modification of my preferred embodiment expander for use with a flange packing having only a circular sealing leg rather than a disc member as illustrated in the previous figures. In this embodiment, a notch 41 is provided in the pressure plate 32, and the strip expander is provided with an upwardly extending anchor leg 42 in place of the downwardly depending leg or anchor wall 15. It will be readily apparent, that the leg 42 will provide substantially the same flexibility in the expander device as provided by the depending legs 15 because it is positioned at an angle to the plane of flexing. This embodiment of my expander device is accurately positioned relative to the inner surface of the flange 36 by a back wall 43 of the notch 41, against which the anchor leg 42 abuts. In all other respects, this embodiment of my improved expander device operates similar to the embodiment illustrated in the Figures 12, 13 and 14.

In the Figure 16, I have shown a cross-sectional view of a further embodiment of my invention. In this embodiment, the foundation portion 14 is all in one plane and may be inserted between the pressure plate 32 and the packing 34 without the provision of a special notch. Thus, the embodiment of this invention is bent only along one of the illustrated bend lines 27 of Figure 1. This expander device will be positioned relative to the packing by the abutment of the pressure plate 32 against the expander at the bend between the pressure wall portion 16 and the bottom land portion 14. This embodiment is useful in larger diameter packings in which the flexibility is sufficiently provided by only one leg being at an angle to the plane of the bottom land portion 17.

In the Figures 8, 9, 10 and 11, I have illustrated a second embodiment of my improved expander device which may be used to provide outwardly extending pressure as described in connection with the embodiment of Figures 4 and 6 and illustrated in use in the Figures 12, 13 and 14, and in addition thereto, may be used to provide inwardly extending force and apply pressure to the surface of a shaft sealing flange packing when flexed in the opposite direction. In this embodiment of my invention, substantially symmetric cleavages 45 and 46 are provided in the expander blank. The series of cleavages 45 are rectangular slot members extending from the side edge 11 inwardly of the strip, and the series of cleavages 46 extend inwardly of the strip from the side edge 12. The cleavages 46 are rectangular slot cleavages substantially identical to the slot cleavages 45. The strip thus provided comprises a plurality of leg members 47 along the side edge 12 and a plurality of leg members 48 along the side edge 11. Further, this embodiment of my invention is bent along the bend lines which are in every respect similar to the bend lines illustrated in the Figure 1, and are therefore numbered 27 and 28 as in the Figure 1. This embodiment of my invention also has substantially the same cross-sectional configuration as the first described embodiment, and is illustrated in the Figure 11 of the drawing. However, in operation this embodiment of the invention may be flexed about either of two oppositely disposed centers, as illustrated by the Figures 9 and 10, respectively. This freedom to flex in both directions is accomplished by the provision of slot cleavages 46 along the side edge 12 rather than the cut cleavages 22 as illustrated in the Figure 1. Thus, either leg members 47 or the leg members 48 may be brought closer together in order to flex the device about an arcuate path. However, the embodiment illustrated by the Figure 1 through 7 has the advantage that a greater amount of surface metals is available to contact the inner surface of the flange 36 because the metal is not cut away as is done in making the slot cleavages 46 of the second embodiment of the invention. Thus, although the second embodiment may be flexed in either of the two directions, a lesser amount of contact surface is provided to contact the flange surface. The second embodiment of the invention may be provided either with or without a forming ring as described in connection with the first embodiment of the invention. If used, the forming ring serves substantially the same purpose and is used in the same way.

Figures 17, 18, 19, 20:
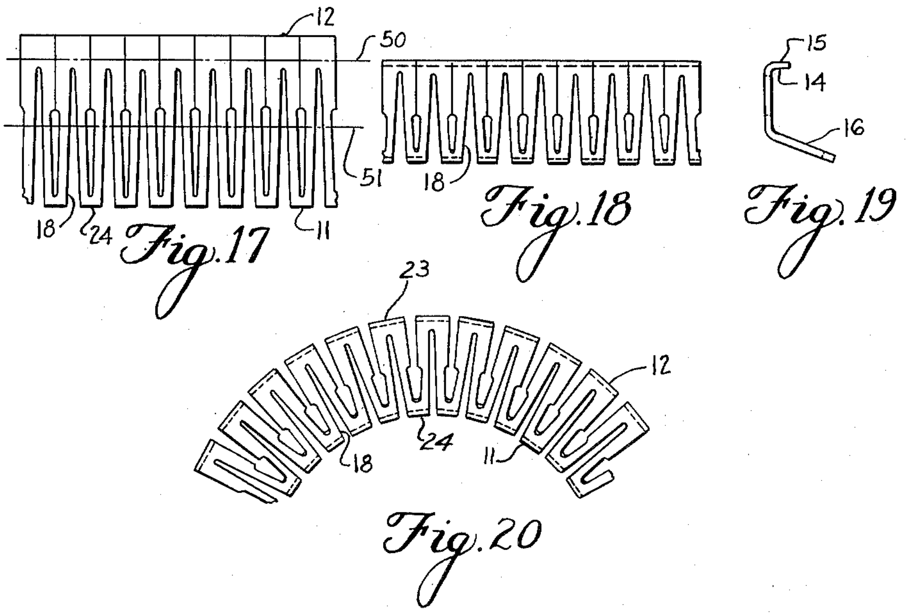
Figure 17 is a view similar to Figure 1, with bend lines indicated therealong for forming the blank for use with a shaft seal flange packing.
Figure 18 is a top plan view of the modified form of my invention.
Figure 19 is an end view of Figure 18.
Figure 20 is a top plan view of the invention of Figure 18 flexed about a circumference in suitable form for use with a shaft seal flange packing.
Figure 21:
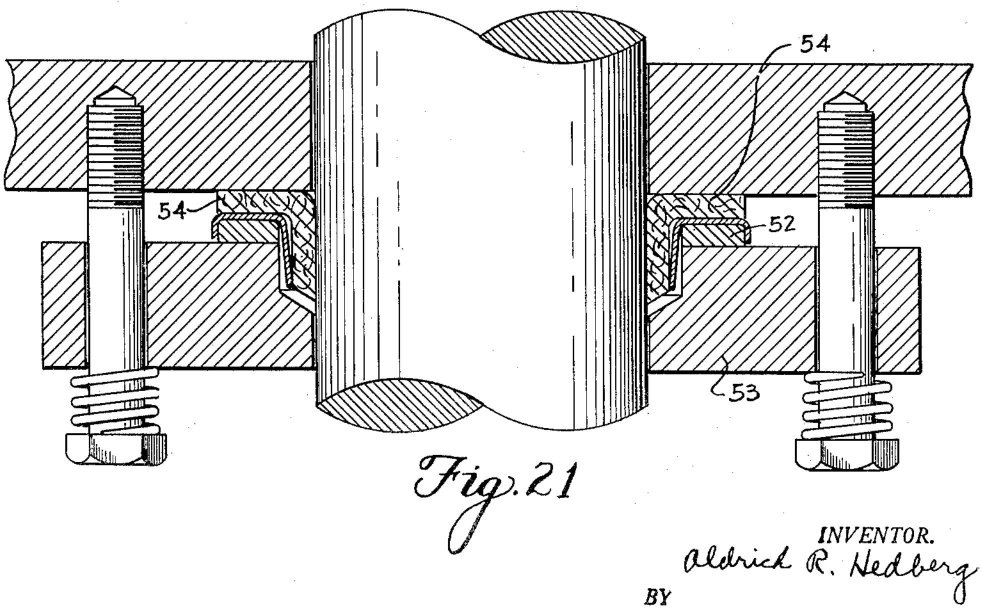
Figure 21 is a cross-sectional view for a shaft seal flange packing with my improved expanding device and forming ring held in place by a pressure plate abutting thereagainst.

In the Figure 17 of the drawing, I illustrate a third embodiment of my invention. In this embodiment, the blank 20 is in every respect similar to the blank illustrated in the Figure 1, but the bend lines 50 and 51 thereof are positioned laterally closer to the side edge 12. The result of positioning the bend lines closer to the side edge 12, is to lengthen the leg members 24 along the side edge 12, and to shorten the leg members 23 along the side edge 11. Thus, when flexed about a circumference, the third embodiment of my invention will appear as in Figures 18 and 19 with the leg members 24 adapted to press inwardly of the circumference, and may be used to force a shaft seal tightly against a shaft. This embodiment of my invention may be provided with a forming ring, or may be used by providing a positioning groove. Further, it may be provided with an upturned anchor portion. These variations are similar to the variations described in connection with the first embodiment illustrated in the Figures 1 through 7.

The Figures 21 through 24 are cross-sectional views through a shaft packing gland employing expander devices made in accordance with the principles of this invention. In the Figure 21, a forming ring 52 is provided, and a pressure plate 53 tightly contacts the ring 52 and holds the expander device in fixed relationship to a shaft flange packing 54.

Figures 22, 23, 24:
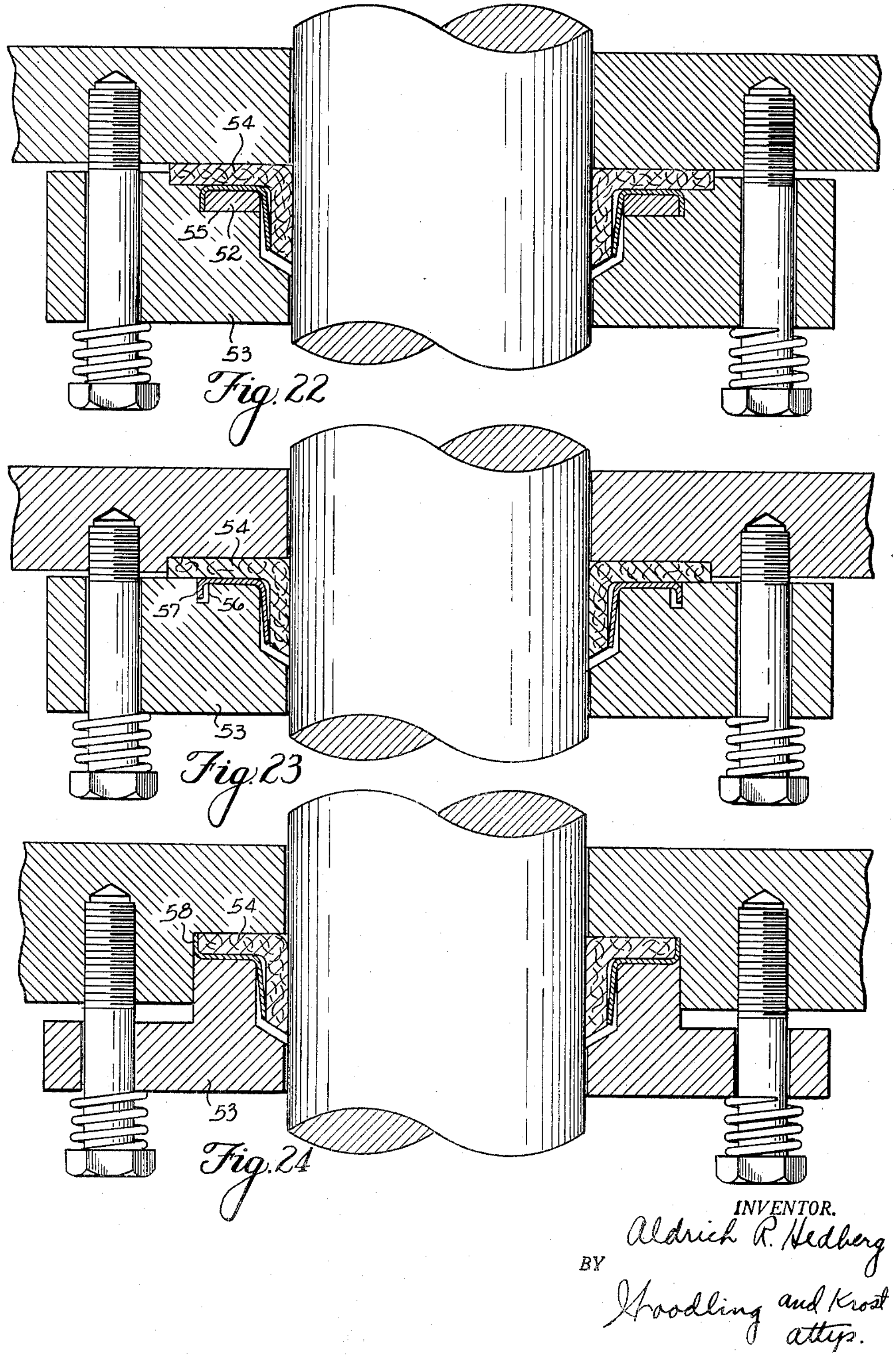
Figure 22 is a view similar to Figure 21 illustrating the pressure plate with a notch therein to accommodate the flange packing and my improved expander device.
Figure 23 is a cross-sectional view of a shaft packing flange illustrating the use of my improved expander device held directly in place by the pressure plate.
Figure 24 is a modified bending form of my improved packing expander in use with a shaft seal flange.

In the Figure 22 of the drawings, the same type packing with a forming ring 52 is employed, but the pressure plate 53 is provided with a recess notch 55 to accommodate the expander and ring. In this view, I have illustrated the packing 54 as extending beyond the notch 55 to provide additional seal.

In the Figure 23, I have illustrated a condition similar to the illustration Figure 14. That is, a notch 56 is provided in the pressure plate 53 and has a back wall 57 against which the anchor portion of the expander device may abut and thus be accurately spaced relative to the packing.

The Figure 24 illustrates the third embodiment of the invention having an upturned anchor portion 58. This embodiment is similar in cross-sectional configuration to the embodiment illustrated in the Figure 15, but differs in relationship of parts as described, because of the shifted bend lines making the leg members 24 longer than the leg members 23, and being adapted to flex about a center opposite to the center about which the expander device of Figure 15 is flexed. As stated in conjunction with the embodiment illustrated in the Figure 15, the end portion 58 is at an angle to the bottom land portion of the expander, and therefore the expander is free to flex about the circumference.

As described in this disclosure and claimed in the appended claims, my invention comprises the method of producing flexibility in a strip expander member. The first embodiment provides a maximum of packing contact area in a cylinder type packing, and the third embodiment provides a maximum of contact area in a "hat type" or shaft packing. The second embodiment is universally flexible and serviceable for either type of packing. Also, the expander strip has proven successful for other uses than packing expanders as described. For example, I have found that the blank 20 may be bent along slightly different bend lines to produce a useful backing for an oil wiper on the tool carriageways of a machine tool such as a lathe. Also, the strip may be used as a weather strip, or a weather strip backing and will flex to tightly contact the window edge, regardless of irregularities in the edge.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A packing expander comprising, a universally flexible strip of spring metal resistant to flexing deformation, said expander having a cross-sectional configuration including a foundation portion with an anchor leg, said foundation portion having a width greater than the length of said anchor leg and lying in a predetermined plane, and a pressure-exerting wall leg portion, said pressure-exerting wall consisting of a series of separate sections formed from a solid strip by division cuts with no material removed between the sections and which lie together when the strip is extended in a straight line to form a wall with substantially no space between the sections, said anchor leg and pressure-exerting wall extending from said foundation portion in diverging paths, the division cuts between the sections constituting a first series of cleavages extending transversely of said expander, a second series of cleavages in the form of slots extending across the anchor leg and foundation portion, said first and second series of cleavages being longitudinally staggered to retain said expander as a one-piece structure.

2. A packing expander comprising, a plurality of separate pressure-exerting blades laterally disposed into a composite longitudinal wall, each blade having two cross-arm members extending therefrom, and an anchor leg portion joining cross-arm members of adjacent blades, one of said cross-arm members of each blade extending to the anchor leg portion joining that cross-arm member with a cross-arm member of a first adjacent blade, and the other cross-arm member extending to the anchor leg portion joining that other member with a cross-arm number of a second adjacent blade, said cross-arm members being spaced one from the other, said expander having a cross-sectional configuration which is generally U shaped with the blades forming one leg and the anchor leg portion forming the other leg of the U, said leg portion formed of the blades being substantially longer than said anchor leg portion, and in which the blades and the anchor leg portion extend in generally diverging paths.

3. A packing expander comprising, a universally flexible strip of spring metal resistant to flexing deformation, said expander having a cross-sectional configuration including a foundation portion with an anchor leg, and a pressure-exerting wall leg portion, said cross-sectional configuration being generally U-shaped with the foundation portion forming the bottom of the U and the anchor leg and pressure-exerting wall forming the legs thereof, said pressure-exerting wall being substantially longer than said anchor leg portion, said anchor leg and wall leg extending in generally diverging paths, said expander having a first series of cleavages, each cleavage of the first series extending transversely of said article at least across said foundation portion, said expander having a second series of cleavages, each cleavage of the second series extending transversely of said expander at least across said foundation portion, said first and second series of cleavages being longitudinally staggered to retain said expander as a one-piece structure, at least one of said series of cleavages being in the form of longitudinal slots.

4. A packing expander comprising, a universally flexible strip of spring metal resistant to flexing deformation, said expander having a cross-sectional configuration including a foundation portion with an anchor leg, and a pressure-exerting wall leg portion, said cross-sectional configuration being generally U-shaped with the foundation portion forming the bottom of the U and the anchor leg and pressure-exerting wall forming the legs thereof, said anchor leg and wall leg extending from said foundation portion in generally diverging paths, said pressure-exerting wall portion being substantially longer than said anchor leg portion, said expander having a first series of cleavages, each cleavage of the first series extending transversely of said article at least across said foundation portion, said expander having a second series of cleavages, each cleavage of the second series extending transversely of said expander at least across said foundation portion, said first and second series of cleavages being longitudinally staggered to retain said expander as a one-picee structure, both said series of cleavages being in the form of longitudinal slots.

5. A packing expander comprising, a universally flexible strip of spring metal resistant to flexing deformation, said expander having a cross-sectional configuration including a foundation portion with an anchor leg, and a pressure-exerting wall leg portion, said cross-sectional configuration being generally U-shaped with the foundation portion forming the bottom of the U and the anchor leg and pressure-exerting wall forming the legs thereof, said anchor leg and wall leg extending in generally diverging paths, said expander having a first series of cleavages, each cleavage of the first series extending transversely of said article at least across said foundation portion, said expander having a second series of cleavages, each cleavage of the second series extending transversely of said expander at least across said foundation portion, said first and second series of cleavages being longitudinally staggered to retain said expander as a one-piece structure, one of said series of cleavages being in the form of longitudinal slots, the other series of cleavages being in the form of simple division cuts.

6. A packing expander comprising, a universally flexible strip of spring metal resistant to flexing deformation, said expander having a cross-sectional configuration including a foundation portion with an anchor leg, and a pressure-exerting wall leg portion, said cross-sectional configuration being generally U-shaped with the foundation portion forming the bottom of the U and the anchor leg and pressure-exerting wall forming the legs thereof, said anchor leg and wall leg extending in generally diverging paths, said pressure-exerting wall portion being substantially longer than said anchor leg portion, said expander having a first series of cleavages, each cleavage of the first series extending transversely of said article at least across said foundation portion, said expander having a second series of cleavages, each cleavage of the second series extending transversely of said expander at least across said pressure-exerting wall leg portion, said first and second series of cleavages being longitudinally staggered to retain said expander as a one-piece structure, at least one of said series of cleavages being in the form of longitudinal slots, and a forming ring, said expander being flexed to conform to the shape of said forming ring, said forming ring and expander fitting together with the ring united to the foundation portion of the expander.

ALDRICH R. HEDBERG.

REFERENCES CITED

The following references are of record in the file of this patent:

UNITED STATES PATENTS

| Number | Name | Date |
|---|---|---|
| 345,767 | Buckley | July 20, 1886 |
| 1,316,534 | Cox | Sept. 16, 1919 |
| 1,938,249 | Fretter | Dec. 5, 1933 |
| 1,958,120 | Tuxbury et al. | May 8, 1934 |
| 1,969,008 | Hubbard | Aug. 7, 1934 |
| 2,049,063 | Hubbard | July 28, 1936 |
| 2,088,703 | Hubbard et al. | Aug. 3, 1937 |
| 2,224,338 | Bowers | Dec. 10, 1940 |
| 2,342,458 | Davies | Feb. 22, 1944 |
| 2,434,484 | Chambers | Jan. 13, 1948 |
| 2,434,485 | Chambers | Jan. 13, 1948 |